United States Patent [19]

Affa

[11] 3,907,337
[45] Sept. 23, 1975

[54] ANGULARLY ADJUSTABLE DUCT CONNECTOR
[75] Inventor: Stephen N. Affa, Torrence, Calif.
[73] Assignee: General Connectors Corporation, Burbank, Calif.
[22] Filed: June 21, 1973
[21] Appl. No.: 372,061

[52] U.S. Cl. ............... 285/114; 285/265; 285/367
[51] Int. Cl.² ...................................... F16L 13/04
[58] Field of Search .......... 285/114, 265, 369, 233, 285/234, 367

[56] References Cited
UNITED STATES PATENTS
2,904,356   9/1959   Love ............................... 285/265 X
2,936,185   5/1960   Olsen et al ...................... 285/265 X
3,632,144   1/1972   Shire et al ....................... 285/369 X
3,776,579   12/1973  Gale ................................ 285/233

Primary Examiner—Richard J. Scanlan, Jr.
Attorney, Agent, or Firm—Lyon & Lyon

[57] ABSTRACT

An angularly adjustable duct connector, intended primarily for high temperature air ducting systems for aircraft, having an internally disposed universal joint for mechanical connection between two ducts and an enclosing seal connection which permits angular displacement of the ducts and the seal connection being spaced therefrom to reduce exposure to heated air passing through the ducts.

3 Claims, 5 Drawing Figures 3,907,337

1

ANGULARLY ADJUSTABLE DUCT CONNECTOR

BACKGROUND OF THE INVENTION

Ducts, such as employed in aircraft, have been connected by sealing couplings such as disclosed in U.S. Pat. Nos. 3,206,229 and 3,540,756. Externally of these couplings various means have been provided to mechanically restrain the ducts with respect to each other.

SUMMARY OF THE INVENTION

This invention is directed to an angularly adjustable duct connector, which utilizes an internal mechanical restraint and an external sealing connector and is summarized in the following objects:

First, to provide a duct connector which incorporates a novely arranged internal universal joint including a pair of tubular elements, arranged for attachment to ducts intended to be connected, each tubular element having a pair of diametrically opposed extensions, joined to a common ring and so arranged as to provide uninterrupted flow of air between the ducts.

Second, to provide a duct connector, as indicated in the preceeding object, which incorporates a novely arranged sealing connector enclosing the universal joint and permitting angular displacement of the tubular elements and the ducts.

Third, to provide a duct connector as indicated in the preceeding objects wherein the sealing connector includes novel means for spacing it's sealing elements from the tubular elements to the temperature of air passing through the ducts, thereby permitting use of the duct connector for passing relatively hot air as is desired in aircraft ducting systems.

Fourth, to provide a duct connector, as indicated in the other objects, wherein new seals may be manipulated through the connector with only partial disassembly of the connector and without disturbing the ducts connected thereto.

Figure 1:
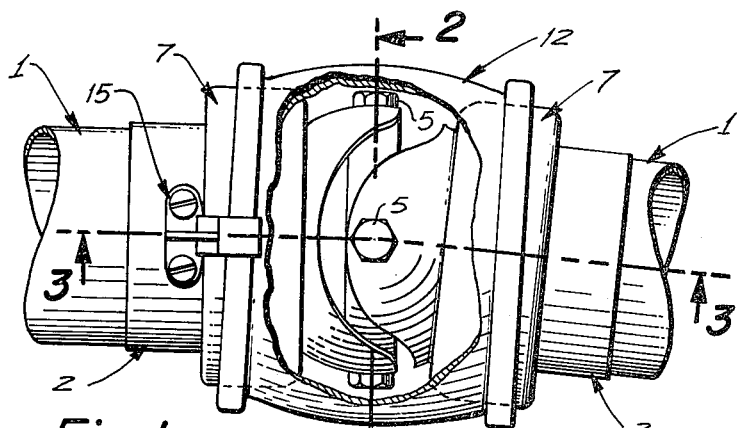
FIG. 1 is a side view of the angularly adjustable duct connector with portions broken away to illustrate internal construction.
Figure 2:
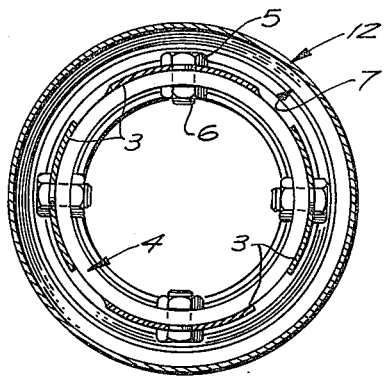
FIG. 2 is a transverse sectional view taken through 2—2 of FIG. 1.
Figure 3:
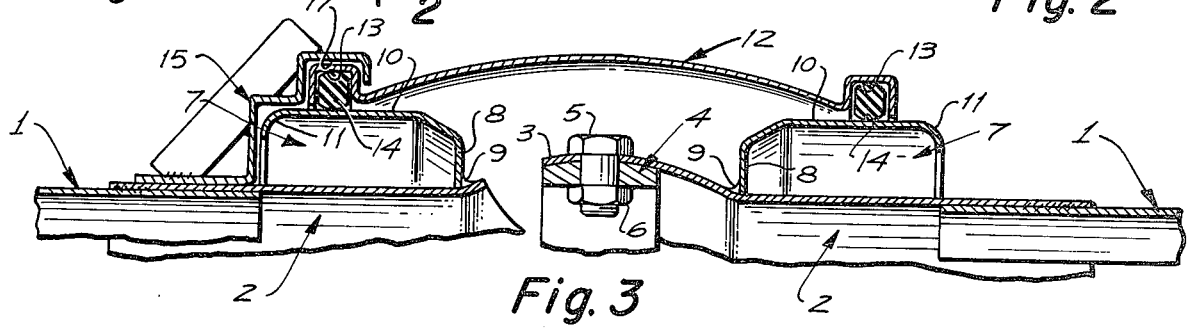
FIG. 3 is an enlarged fragmentary longitudinal sectional view thereof taken through 3—3 of FIG. 1.

Reference is first directed to FIGS. 1 through 3. The angularly adjustable duct connector is intended to join a pair of ducts 1 and include tubular elements 2 suitably secured to the confronting ends of a pair of ducts. Each tubular element includes a pair of diametrically disposed extensions 3 of spherical contour. The extensions of the two tubular elements overlap axially and are circumferentially spaced ninety degrees. A connector ring 4, its outer surface defining a spherical zone, fits within the extensions 3 and is joined thereto by journal bolts 5 secured by nuts 6 which may be welded to the ring 4. The inner diameter of the connector rings preferably is equal to or exceeds the diameter of the ducts 1 so as to minimize the disturbance to the flow of fluid to and between the ducts. Then joined by the ring

2

4, the extensions 3 are spaced sufficiently from each other as to permit a predetermined angular displacement in any direction, that is, the connection between the tubular elements forms a tubular universal joint.

Each tubular element 2 receives a spacer ring 7 having an internal main flange 8 joined by a welded connection 9 to the corresponding tubular element. Extending axially in the opposite direction from the corresponding extensions, is a cylindrical sealing surface 10 which terminates in an internal reinforcing flange 11.

Encompassing the region between the spacer rings 7 is a connecting member 12 which may have a spherical contour. Its axial extremities are provided with inwardly facing channels 13 confronting the cylindrical sealing surfaces 10. Each channel receives a seal ring 14 which may be conventional and of the type shown in U.S. Pat. No. 3,206,229 or 3,698,272.

In order to limit axial movement of the connecting member 12 and its seal rings 14 with respect to the spacer rings 7, a retainer bracket 15 is provided joined by screws or other fastening means to one of the tubular elements 2. The retainer bracket terminates in an internally directed channel 17 which fits over one of the channels 13.

Operation of the angularly adjustable duct connector shown in FIGS. 1, 2 and 3 is as follows:

The ducts joined by the connector may occupy a fixed angular relation or may move intermittently or constantly. By reason of the fact that the ring 4 is essentially as large as the ducts 1 there is a minimal disturbance of fluid flow in the chamber within the connecting member 12 and between the spacer rings 7, however, the fluid contained therein is subject to minimal agitation.

This arrangement is quite suitable for air ducts particularly ducts or conduits which may be transmitting heated air or gasses such as may be used in aircraft. By reason of the non-turbulent or quiescent condition in the chamber formed by the connecting member 12 and spacer rings 7, the transfer of heat to the seal rings 14 is reduced. Also the spacer rings 7 except for the main flanges 8 are spaced from the tubular elements 2 so that the heat transfer is limited principally to conduction through the main flanges 8 which may be relatively thin. Also, the spacer rings are exposed to ambient temperature which in most cases is substantially less than that of the fluid within the duct line. These factors tend to reduce the effective temperature to which the seal rings are exposed thereby reducing the temperature characteristics required of the seal rings or permitting the use of the connector on duct systems requiring higher fluid temperatures.

Figure 4:
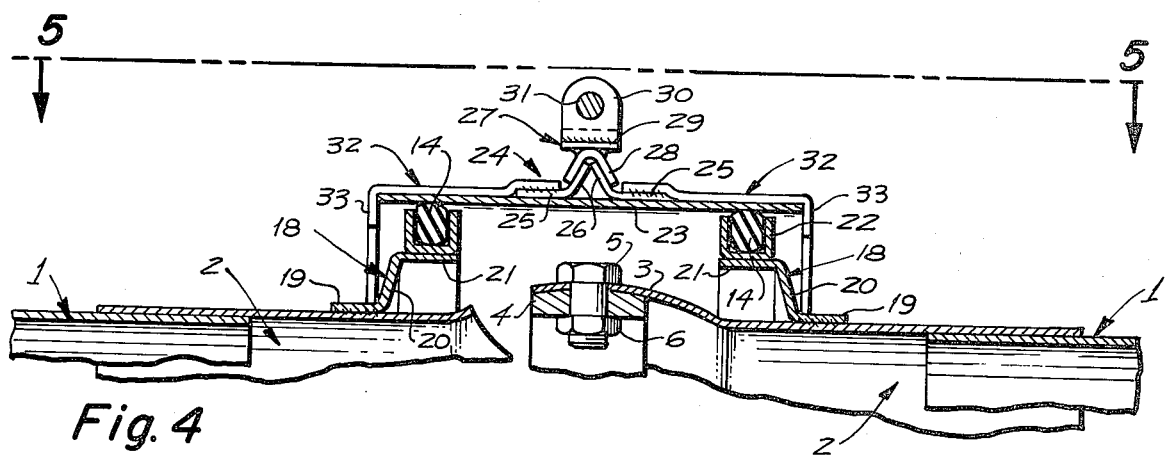
FIG. 4 is a fragmentary longitudinal sectional view similar to FIG. 3 showing a modified form of the angularly adjustable duct connector.
Figure 5:
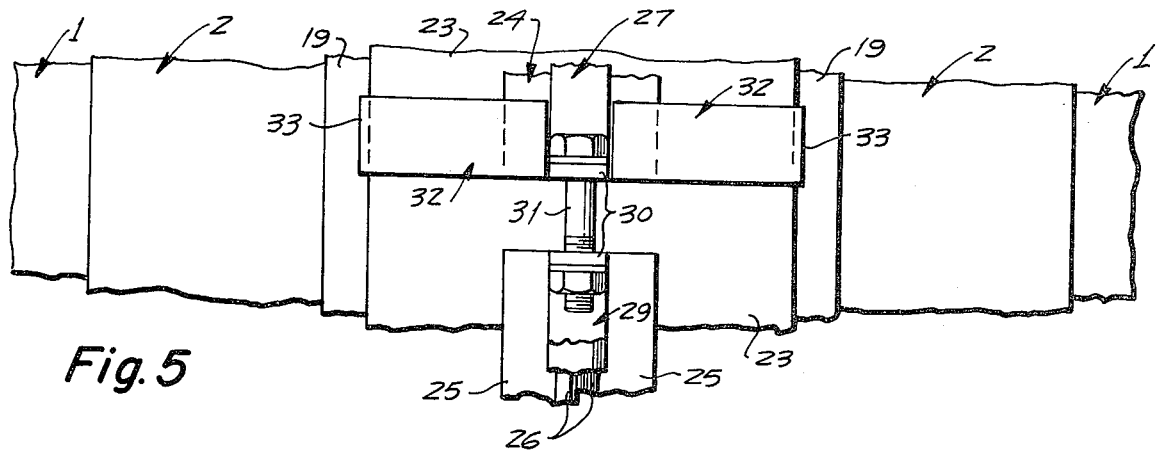
FIG. 5 is a fragmentary side view thereof taken from 5—5 of FIG. 4.

Reference is directed to FIGS. 4 and 5. The universal joint structure is the same as shown in FIGS. 1, 2 and 3. In place of the spacer rings 7, spacer rings 18 are used which are essentially Z-shaped in cross section, that is, each spacer ring includes a radially inner portion 19 secured to a corresponding tubular element 2, a radially outwardly directed web or conical web 20 and a radially outer portion 21. Attached to each radially outer portion 21 is a seal ring channel member 22 which receives a seal ring 14.

Bridging between the seal rings which face outward is a cylindrical connecting member 23 which protrudes axially beyond the seal rings. In order to prevent axial displacement of the connecting member 23 from the seal rings, a retainer structure 24 is provided which includes a pair of bands 25 having flanges 26 disposed in contiguous relation so as to be joined by clamp ring 27 which may be conventional. For example, the clamp ring may be a split ring including a channel member 28 and a band member 29, the band member having end fittings 30 which are joined by a bolt 31. Secured to the bands 25 and extending axially therefrom are one or more pairs of retainer strips 32 having hook ends 33 extending over the axial ends of the connecting member 23 for engagement with a corresponding channel member 22 thereby to limit axial displacement of the connecting member.

Operation of the angularly adjustable duct connector shown in FIGS. 4 and 5 is essentially the same as that shown in FIGS. 1, 2 and 3.

In both embodiments the seal rings 14 extend beyond their restraining channel members to permit the desired angular displacement of the confronting surfaces without contact between the channel members and confronting surfaces. An angular displacement in the order of 5° to 8° is readily obtainable.

It should be noted that with regard to either embodiment, the seals 14 are replaceable without disturbing the ducts 1 or their connections with the tubular elements 2. This is accomplished by removing the retainer bracket 15 or the retainer structure 24, then sliding the connecting member 12 or 23 clear and removing the seals 14 from their channels and severed for removal.

To install new seal rings, the exposed universal joint assembly is then partially disassembled by removing two adjacent bolts 5 which are disposed in 90° relation and loosening the remaining two bolts so that the connecting ring may be tilted in such a manner that new seal rings 14 may be manipulated through the sinuous slot formed between the extensions 3 of the tubular elements 2.

While particular embodiments of this invention have been shown and described, it not intended to limit the same to the details of the constructions set forth, but instead, the invention embraces such changes, modifications and equivalents of the various parts and their relationships as come within the purview of the appended claims.

I claim:

1. An angularly adjustable connector for joining a pair of hot-gas transmitting ducts, said connector comprising:
   a. a pair of thin wall tubular elements adapted to form confronting ends of a pair of ducts, each tubular element having radially enlarged end portions of spherical contour including a pair of diametrically disposed axial extensions arranged in axially overlapping and circumferentially displaced relation to the extensions of the other tubular elements;
   b. a ring disposed within the extensions;
   c. pivot means connecting the ring and each of said extensions whereby the tubular elements are capable of universal angular displacement relative to each other;
   d. a pair of thin wall spacer ring elements, each including an inwardly directed flange secured to a corresponding tubular element and a cylindrical portion concentric with and spaced from the tubular element to minimize heat transfer to the cylindrical portion;
   e. A thin wall connecting member axially movable into confronting relation to the cylindrical portions of both the spacer rings;
   f. seal rings interposed between the cylindrical portions of the spacer rings and the connecting member and supporting said connecting member for axial sliding along said spacer ring elements;
   g. and removable retainer means removably mounted on said connector and limiting axial movement of the connecting member relative to said spacer ring elements.

2. A connector as defined in claim 1, wherein:
   a. the connecting member includes internally directed channel flanges at its extremities to receive the seal rings;
   b. and the retainer means includes a bracket secured to one of the tubular elements and a clip fitted over one of the channel flanges.

3. A connector as defined in claim 1, wherein:
   a. the removable retainer means includes a separable band encompassing the connecting member and clip elements radially overhanging the axial ends of the connecting member outwardly of said inwardly directed flanges of said spacer ring elements.

* * * * *